United States Patent

Dahlin

[15] 3,641,349
[45] Feb. 8, 1972

[54] METHOD FOR MEASURING THE AMOUNT OF SUBSTANCE ASSOCIATED WITH A BASE MATERIAL

[72] Inventor: Erick B. Dahlin, Saratoga, Calif.
[73] Assignee: Measurex Corporation, Santa Clara, Calif.
[22] Filed: Sept. 29, 1969
[21] Appl. No.: 861,588

[52] U.S. Cl. ...................................250/83.3 H, 250/83.3 D
[51] Int. Cl. ..........................................................G01j 3/42
[58] Field of Search..............................250/83.3 H, 83.3 D

[56] References Cited

UNITED STATES PATENTS 3,205,355 9/1965 Ehlert ..............................250/83.3 H
3,405,268 10/1968 Brunton ..........................250/83.3 H

*Primary Examiner*—Archie R. Borchelt
*Attorney*—Flehr, Hohbach, Test, Albritton & Herbert

[57] ABSTRACT

Apparatus and method of measuring the amount of water absorbed in paper being made by a papermaking machine in which the paper is scanned by a radiation source emitting 1.94 micron radiation which is strongly sensitive to the moisture in the paper and 1.8 micron radiation which is much less sensitive. This radiation is passed through the paper sheet and split into two beams by filters. The two wavelengths are detected by lead sulfide cells. A light chopper interrupts the total beam to cause the AC signal output of the cell to reflect the received intensity of the particular wavelength with the actual impedances of both cells being nullified. The ratio of the peak values of the AC signals from the cells is proportional to moisture content.

2 Claims, 6 Drawing Figures

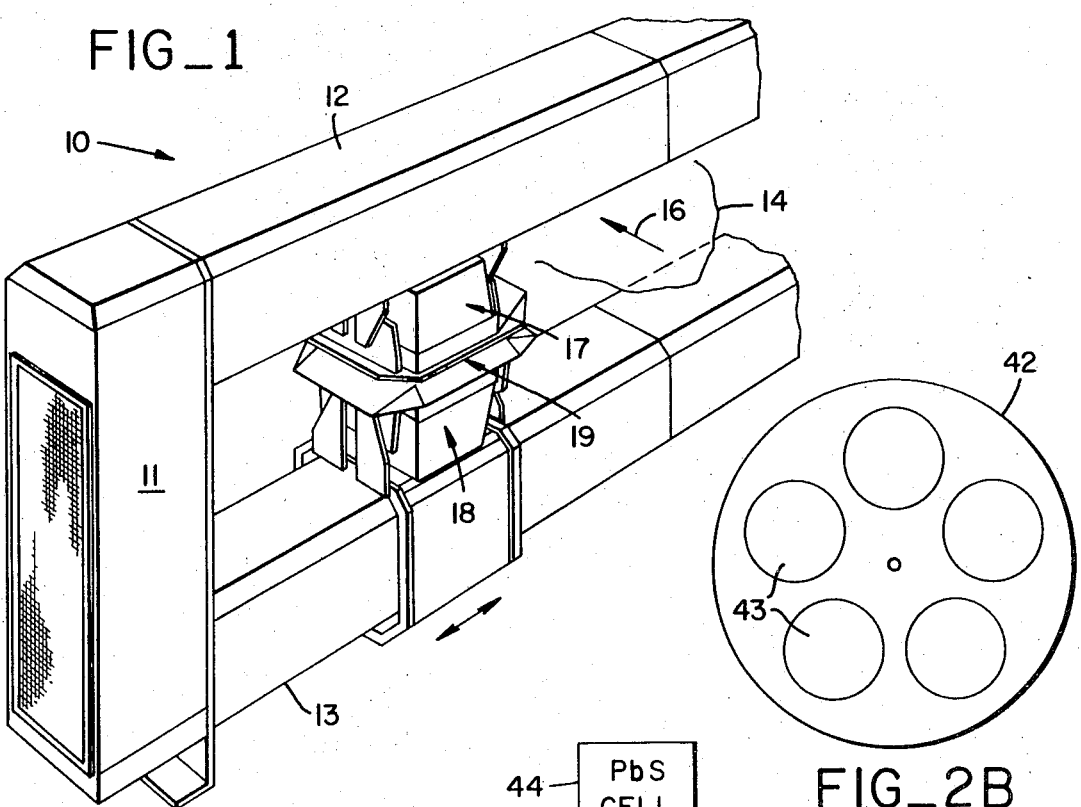
FIG_1
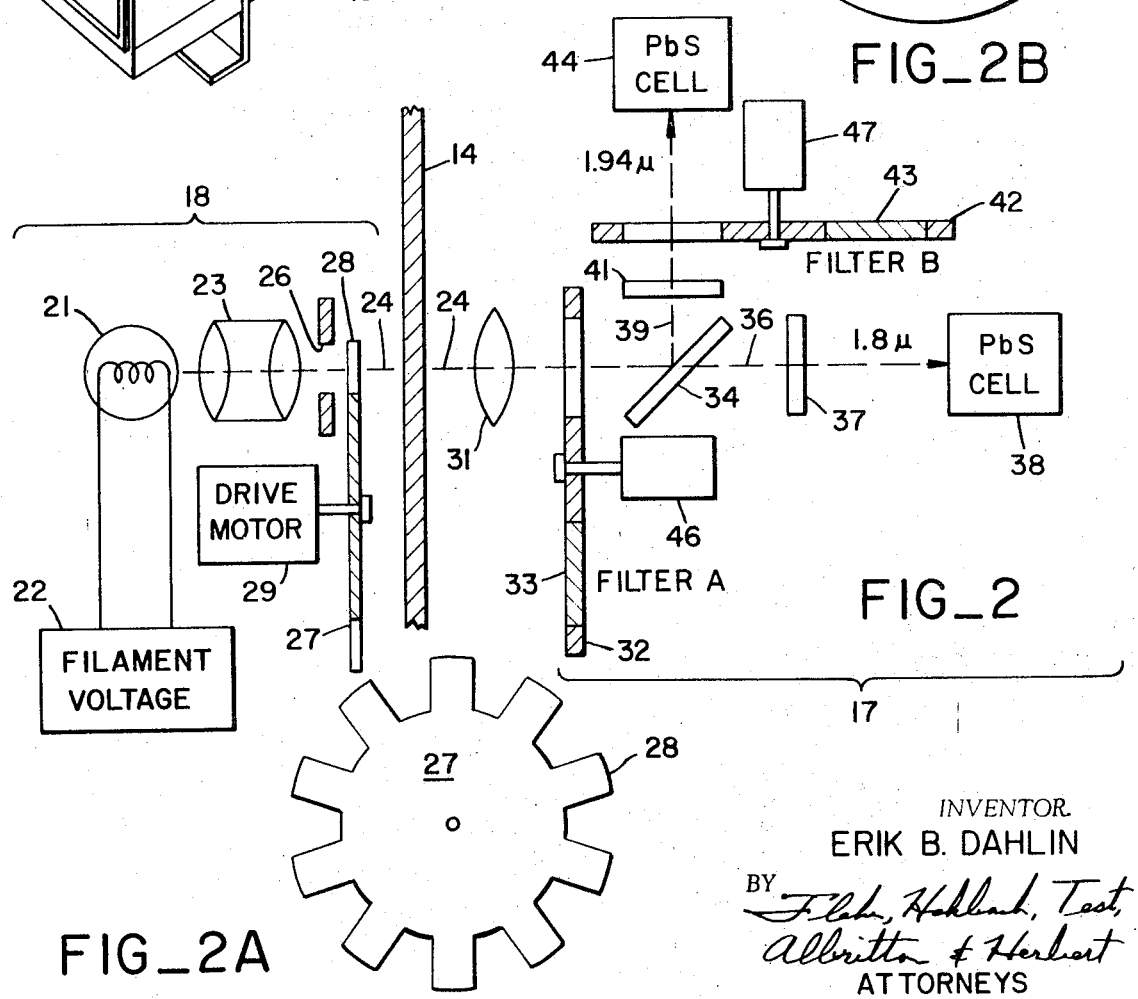
FIG_2B
FIG_2
FIG_2A
INVENTOR.
ERIK B. DAHLIN
ATTORNEYS

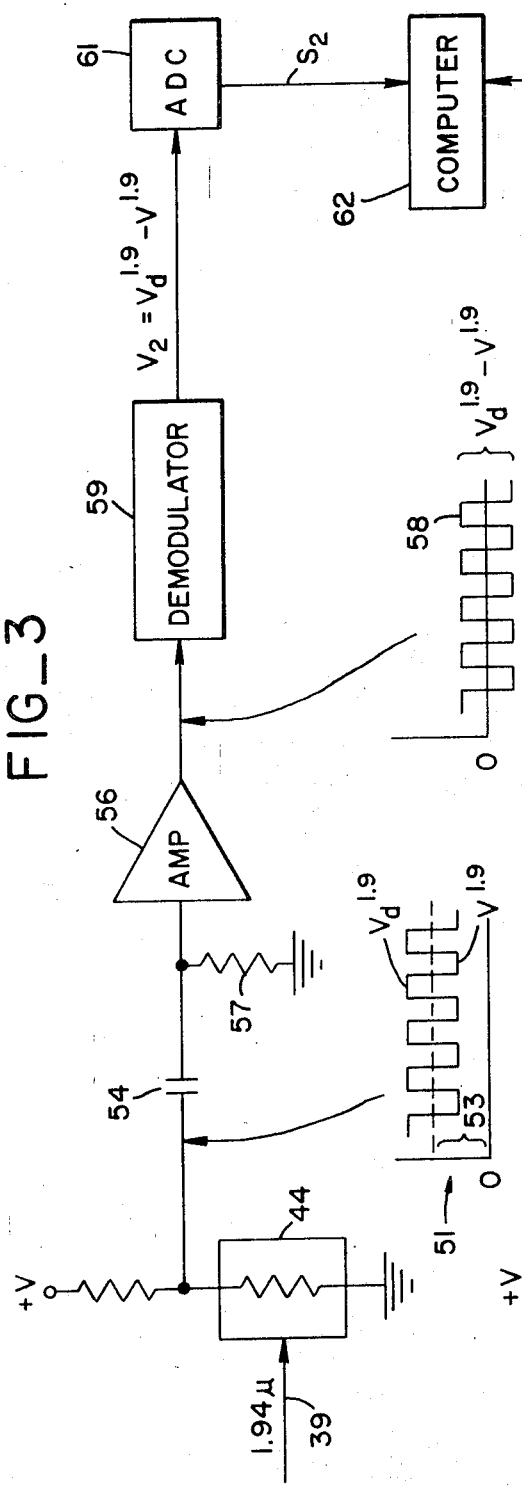
FIG_3
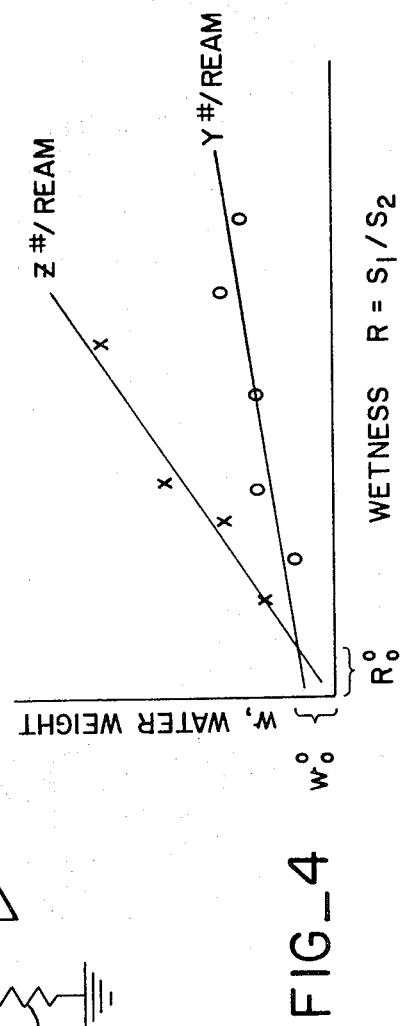
FIG_4

METHOD FOR MEASURING THE AMOUNT OF SUBSTANCE ASSOCIATED WITH A BASE MATERIAL

BACKGROUND OF THE INVENTION

The present invention is directed to apparatus for measuring the amount of a substance that is sorbed by a solid material and more specifically to the amount of moisture which has been either absorbed or adsorbed by paper material such as produced by a papermaking machine. It is also directed to measurement of coatings and moisture in gas streams, water in hydrocarbons, etc.

Moisture gauges for measuring the moisture content of sheet material such as paper being manufactured by a papermaking machine are well known in the art. Normally the gauge includes an infrared radiation source that emits radiation in two spectral bands. The first band of 1.8 microns impinges on the paper and the amount of transmission through the paper or reflected from the paper is a function of certain parameters of the paper. It is known that in the case of a spectral band encompassing 1.8 microns that this wavelength region is relatively insensitive to the moisture content of the paper. However, the radiation source also produces radiation in the spectral band including 1.94 microns which lies within the absorption band of the water or moisture contained by the paper. Thus, the amount of infrared light or radiation that passes through or is reflected at a wavelength of 1.94 microns is a function of the amount of water in the paper.

Normally the intensity of the received infrared radiation after being attenuated by the paper sheet is measured by a detector such as those of the lead sulfide type. A change in received intensity changes the impedance or resistance of the detector.

It is well known that by the use of Beer's law, which states that the amount of light that passes through or is reflected from a sheet of paper is a function of its absorption reflection, and scatter coefficients both due to water and to paper, that an equation for water content may be derived. Such equation for deriving the weight of water includes a ratio of the resistances of the detector under the successive influence of the two different spectral bands. This equation includes exponential functions and is highly nonlinear. This nonlinearity is aggravated by the fact that as discussed above there are two independent parameters in the equation; namely, that of the impedance of the detector under the influence of the 1.8 micron radiation and then under the influence of the 1.94 micron radiation. In prior devices the successive illumination of a single detector by the two different wavelengths of radiation was achieved by the use of a chopper which would cause the system to first look at the 1.8 micron or reference beam and then at the 1.94 micron or sample infrared beam.

Since the handling of a complex nonlinear equation would be exceedingly difficult if solved in its entirety, prior art devices have made approximations. In other words, linearities have been assumed which have not actually been present. Thus, the accuracy of prior devices is relatively poor.

The use of a chopper or wheel containing several filters also limited the frequency response and therefore the measurement speed of the system since the relatively high mass of the filter wheel effectively limited its speed of rotation.

Only a single detector was used in the prior art because of the difficulty of matching the characteristics of the detector material; e.g., lead sulfide. This caused the standardization procedure to be cumbersome and not readily adaptable to computerization.

OBJECTS AND SUMMARY OF THE INVENTION

It is therefore, a general object of the invention to provide an improved apparatus and method for measuring the amount of substance that is associated with a base material.

It is another object of the invention to provide apparatus as above which has improved frequency response and is capable of making high-speed measurements.

It is another object of the invention to provide apparatus as above which is readily adaptable to automatic computer support of measurement and standardization.

In accordance with the above objects there is provided apparatus for measuring the amount of substance that is associated with a base material. The apparatus includes a radiation source that emits a first spectral band of radiation that impinges on the material but lies outside of an absorption band of the substance and that emits a second spectral band of radiation that lies within a resonant absorption band of the substance. First and second detector means are respectively responsive to the intensities of the spectral bands which are reflected from or transmitted through the material to produce first and second electric signals proportional to the received intensity of radiation.

Means are provided for recurrently interrupting the radiation emission to the detector means, the detector means in the absence of the impinging radiation producing third and fourth electric signals proportional to a predetermined internal parameter of the detector means. Means are provided for obtaining the difference between the first and third signals and the second and fourth signals and means for obtaining the ratio between the difference values the ratio being indicative of the amount of the substance.

BRIEF DESCRIPTION OF THE DRAWINGS

FIG. 1 is a partial perspective view of a portion of apparatus for measuring the amount of substance that is associated with the base material incorporating the present invention;

FIG. 2 is a schematic representation partially in block diagram form and partially in cross section of a portion of he apparatus of FIG. 1 and showing the optical system of the present invention;

FIG. 2A is a plan view of one of the elements of FIG. 2;

FIG. 2B is a plan view of another of the elements of FIG. 2;

FIG. 3 is a block diagram showing the electrical circuitry of the present invention along with associated waveforms; and FIG. 4 is a graph useful in understanding the present invention.

DETAILED DESCRIPTION OF THE PREFERRED EMBODIMENT

As disclosed in a copending application in the names of Bossen et al. entitled "Basis Weight Gauging Apparatus, System and Method," Ser. No. 791,972, filed Jan. 17, 1969, a characteristic of a web or sheet material being manufactured by a papermaking machine can be measured by mounting a radiation detector and a radiation source on a carriage. The carriage scans in a cross direction while the sheet material is moving in a machine or perpendicular direction to the cross direction. FIG. 1 illustrates a scanner 10 which includes a framework 11 which includes a pair of spaced upper and lower parallel beams 12 and 13 which extend laterally of the sheet material or paper indicated at 14 which is being produced by the papermaking machine (not shown). The paper 14 travels through the scanner in the direction as shown by the arrow 16. Upper and lower gauging heads 17 and 18 are provided in the framework 11 and are adapted to travel longitudinally of the framework and transversely of the paper sheet 16.

Specifically, paper sheet 14 travels through a gap 19 provided between the gauging heads 17 and 18. The drive for the gauging heads is such that they can be moved off sheet or in other words, off to the side of the sheet during each direction of travel. The lower gauging head 18 contains a radiation source that emits radiation that impinges on the paper 14 and the intensity of which is detected by a radiation detector included in gauging head 17.

The optical system of the present invention is as illustrated in FIG. 2 in which a source unit 18 includes a tungsten light source 21 having filament voltage source 22 which is capable of remote adjustment to thereby vary the intensity of the light source. The light source 21 may be of the General Electric type Q.Ga/t4DCR, 200 watts which produces radiation both in the spectral band including 1.8 microns and in the spectral band including 1.94 microns. Radiation from the radiation source is collimated by an optical system schematically shown at 23 with the beam path indicated by the dashed line 24 extending through an aperture 26 and thence through a light chopper wheel 27 which is best shown in FIG. 2A. Light chopper 27 serves to recurrently interrupt the radiation emission of infrared light source 21 by means of the teeth 28 on its periphery. It is apparent that by either changing the number of teeth per unit length around the circumference of the wheel or the speed of rotation of the wheel the frequency of light interruption can be varied. Light chopper 27 is driven by a drive motor 29.

The beam path 24 extends through paper sheet 14 which in a manner well known in the art and approximately according to Beer's law attenuates the infrared radiation emission from source 21. As discussed above, the radiation wavelength of 1.94 microns is sensitive to moisture in the paper while the 1.8 micron radiation is not affected by moisture. Such radiation transmitted through paper sheet 14 is then detected by detector unit 17 which includes collimating lens 31 in beam path 24. The attenuated radiation on beam path 24 is transmitted through a first standardization filter assembly 32 designated A which consists of a disc including several filter portions 33 of various and different attenuations. In the position shown there is no filter in the beam path. The beam passes through a beam splitter 34 which may be, for example, a half-silvered mirror. One portion of the split beam, indicated at 36, passes through a band-pass filter 37 which has a band pass centered around 1.8 microns and the beam is then detected by a lead sulfide cell 28. The other portion of the split beam 39 passes through a band-pass filter 41 centered at a wavelength of 1.94 microns and thereafter through a second standardization filter assembly 42, designated B, which includes several different filter portions 43 (see FIG. 2B). The beam 39 is detected by a lead sulfide type cell 44.

Filter 32 is similar in structural shape to filter 42 as shown in FIG. 2B. The filter wheels are driven by solenoids 46 and 47.

FIG. 3 illustrates the electrical circuitry which is coupled to lead sulfide cells 38 and 44. The output waveform of each lead sulfide is similar to that shown at 51 which is the specific waveform of the cell 44. The AC component is of a frequency determined by the light chopper 27. The AC component varies between a maximum designated at $V_d^1{}^9$ which is the dark impedance of the cell when impinging radiation has been interrupted by the light chopper and a lower value designated $V^1{}^9$ which is the impedance of the cell when illuminated and receiving the light transmitted through the paper sheet 14. The entire AC component of waveform 51 is offset a certain DC amount designated 53 from a zero level. This offset is eliminated by a blocking capacitor 54 in series with the input to an amplifier 56. The AC component of the signal is dropped across a resistor 57 and appears at the output of the amplifier shown by the waveform of 58. With the offset eliminated the difference between the positive peak and negative peak values indicated as $V_d^1{}^9 - V_1{}_9$ constitutes a signal proportional to the received intensity of radiation.

In the case of the beam path 36 which carries the 1.8 microns wavelength signal similar components designated prime also provide a difference signal which is $V_d^1{}^8 - V^1{}^8$.

Thus far, therefore, the detector means 44 and 38 produce first and second electrical signals, $V^1{}^9$ and $V^1{}^8$, which are proportional to the received intensity of the radiation. Third and fourth signals, $V_d^111^9$ and $V_d^1{}^8$ are also generated by means of the light chopper or interrupter 28 which are proportional to the dark impedance or in other words, an internal parameter of the lead sulfide cells at the time the intensity measurement is being made.

The difference between the first and third signals, namely $V_d^1{}^9 - V^1{}^9$ is sensed by demodulating waveform 58 by a demodulator 59. The demodulator in essence serves as a peak reading voltmeter which has as an output a DC signal, $V_2$. Similarly, the difference between the second and fourth signals, $V_d^1{}^8 - V^1{}^8$, is sensed by demodulator 59' which has a DC output signal $V_1$.

By the above difference process the effect of random impedance variation in the lead sulfide detector cells is nullified. Moreover, the possible error causing random variations are nullified initially and immediately, almost contemporaneously with the intensity measurement. This is crucial since the internal parameter by way of impedance of lead sulfide cells 38 and 44 may at times have a rather rapid drift.

DC signals $V_2$ and $V_1$ are coupled to respective analog to digital converters 61 and 61' to produce digital output signals $S_2$ and $S_1$ which are coupled into a computer calculator 62. The computer calculator takes a ratio measurement $S_1/S_2$ which is proportional to the weight of water in paper 14.

In operation, referring to FIGS. 2 and 3, light from lamp source 21 is projected on paper sheet 14. The teeth 28 and speed or rotation of light chopper wheel 27 allows approximately 350 light pulses per second to reach paper sheet 14. In the detector unit 17, the beam splitter as discussed above diverts 50 percent of the light to lead sulfide cell 44 and the remainder of the nondiverted light reaches cell 38.

The diverted light, shown as beam path 39 passes through a narrow band-pass filter 41 which transmits light in a wavelength band which is sensitive to water absorption which is typically at wavelength of 1.94 microns. The nondiverted light, shown as beam path 36 also passes through a narrow band-pass filter at a wavelength near the water band but still in a range where the water absorption is approximately the same as the paper fiber absorption. Typically, this wavelength is 1.8 microns. During the normal measurement procedure open passages are provided for the light in both filters 32 and 42.

As will be discussed below in the case of filter wheel 32 a neutral density filter is selected in a standardization mode so that the amount of 1.8 micron light that is absorbed is approximately the same amount as a medium weight sheet on the paper machine. Thus, this simulates the paper with zero water content. The second filter 42 during standardization may be rotated to place a neutral density filter in the beam path with 1.94 micron light to simulate a fixed water content. Thus, by use of the dual beam construction as illustrated in FIGS. 2 and 3 readily available neutral density filters may be used for standardization.

CALIBRATION AND STANDARDIZATION

When a new grade material is to be measured by the moisture gauge of the present invention the apparatus must be initially calibrated for this grade group. In addition, after the initial calibration, standardization must be carried on once each scan to provide for short term changes in the associated optical and electrical system. During standardization new calibration constants, as will be explained below, are calculated by either a computer or manual calculation. In fact, the entire calibration method may be done manually in case of laboratory use or by computer where online capability is necessary for machine use.

The following procedure is used for the initial calibration. As shown by the curves of FIG. 4, for a given grade of material or paper water weight, $w$, is dependent on its basis weight or pounds per ream. For an accurate measurement of water weight this variation must be taken into account. The wetness designated as R is provided by the ratio $S_1/S_2$ as discussed in conjunction with FIG. 3. Since it is the percent of moisture that is desired as a measure of quality of the paper being manufactured by a papermaking machine, the actual basis weight or weight per unit area of the paper must also be found. Many techniques for finding basis weight are available and a preferred technique is disclosed in the above-mentioned copending application entitled "Basis Weight Gauging Apparatus, System and Method."

Examination of FIG. 4 indicates that the curves of the figure can be represented by the following equation:

$$w = w_0 + (R - R_0)(A \times Bw + B) \quad (1)$$

where $w_0$, $R_0$, $A$ and $B$ are constants which are updated by standardization. $Bw$ is theoretically the bone-dry basis weight. However, wet $Bw$ may still be used with low accuracy. The percent moisture is indicated by $$\text{Percent Moisture} = w/Bw \times K \quad (2)$$

where $K$ is a constant for unit conversion.

In the original calibration of the moisture-measuring system of the present invention, several moisture samples are prepared for two different grades in a group. Preferably the two different grades are ones with significant weight separation for example, 40 pounds per ream and 50 pounds per ream. From eight to 15 samples of each grade are selected as close to the standard weight per ream as possible and are bone dried or dried with a fixed percentage of moisture remaining and then weighed. This determines their basis weight. In this condition, different quantities of water are then added to each sample and they are sealed in plastic bags to allow the water to be absorbed by the paper. After additional weighing the actual water weight, $w$, of the samples is then known.

The next step in the calibration process is to place one sample at a time in the gap 19 (FIG. 1) of the moisture gauge. A suitable jig (not shown) is used for this purpose. This system is caused to make a reading and a ratio, $R$, is obtained with each sample. The $R$ values are then plotted against the water weight values and the best line is fitted to the samples for each group as indicated by the zeros in the case of the Y pounds per ream curve and the X's is the case of the Z pounds per ream curve of FIG. 4.

The intersection of the two fitted lines is then determined as indicated as $w_0^0$ and $R_0^0$.

Next, to determine the constants $A$ and $B$ of equation (1) the slopes of line Y and line Z are calculated in the following manner to determine the initial values of $A$ and $B$ designated $A_0$ and $B_0$:

$$A_0 = \frac{\frac{\Delta w}{\Delta R}(\text{line } Y) - \frac{\Delta w}{\Delta R}(\text{line } Z)}{Bw(\text{line } Y) - Bw(\text{line } Z)} \quad (3)$$

$$B_0 = \frac{\Delta w}{\Delta R}(\text{line } Y) - A_0 \times Bw(\text{line } Y) \quad (4)$$

where $\Delta w/\Delta R$ is equal to the slope of the fitted line. As will be explained below, the initial values $A_0$ and $B_0$ are updated by standardization.

Another part of the initial calibration or set up procedure for each grade group are deriving two additional ratio constants $R_A$ and $R_B$ which are values obtained from the output of the measuring system. Referring to FIG. 2, when standardization filter A is in the total beam, $R_A$ is read; $R_B$ is a ratio taken with both the filter A in the total beam path and filter B which is in beam path 39 only. These readings are, of course, taken with no paper sheet in the gap. A similar use of filters A and B but in a different type of moisture measurement system is disclosed and claimed in the Hill application mentioned below.

Thus is summary, initially for calibration the constants $A_0$, $B_0$, $R_A^0$ and $R_B^0$ are stored in a computer or other suitable means for use in the actual measurement procedure. At the end of each scan over the paper sheet 14 whose moisture content is being measured, standardization is performed. More specifically, the ratio $S_1/S_2$ termed $R_A$ is computed with the filter A in the beam and similarly the ratio $R_B$ is computed with the additional filter B in the 1.94 micron beam. The updated values of $A$, $B$, $R_0$ and $w_0$ are provided in the standardization procedure by use of the following formulas:

$$A = A_0 \frac{R_A^0 - R_B^0}{R_A - R_B} \quad (5)$$

$$B = B_0 \frac{R_A^0 - R_B^0}{R_A - R_B} \quad (6)$$

$$R_0 = R_0^0 + R_A - R_B \quad (7)$$

$$w_0 = w_0^0 \quad (8)$$

Note that the initial water weight $w_0^0$, typically need not be updated. Also note that equations (5) and (6) rotate the calibration lines Y and Z in FIG. 4 and that equation (7) performs lateral shift of the line being used for the measurements.

Thereafter with the use of equations (1) and (2) the percent moisture can be computed for the paper sheet being measured.

In actual practice the basis weight reading is concurrently supplied the computer of the moisture measuring system from the basis weight measuring system described in the above-mentioned copending application. This basis weight, of course, includes the actual moisture content in a paper. Since the use of the wet basis weight will not provide sufficient accuracy for some purposes it has been found that the bone-dry basis weight which is to be used in the equations (1) and (2) may be found by the following equation:

$$Bw \text{ (bone dry)} = \frac{Bw \text{ (wet)} - Cw_0 - BC(R - R_0)}{1 + AC(R - R_0)} \quad (9)$$

where $C$ is a unit conversion factor equal to $K/100$ and $A$, $C$, $R_0$ and $w_0$ are expressions of equations (5), (6), (7) and (8). Equation (9) is derived from equations (1) and (2) by determining the convergence of these equations when the water weight in the basis weight measurement is taken into account.

Computer techniques can also be used for the purpose of the curve fitting shown in FIG. 4. This can be accomplished by considering the exact bone-dry base weight, water content and ratio rendering for each sample, and applying least square fitting of the parameters in equation (1) to this data.

Thus, in summary, the present invention provides an improved moisture-measuring system in which by the use of the double beam provided by the beam splitter the computerized standardization can be carried as shown above since separate filters can be used and more specifically a single neutral density filter which is stable and readily available can be used for the 1.94 micron wavelength path to simulate the approximate water weight. The use of the light chopper allows high-frequency capabilities and rapid measurements because of its lighter mass and its high rotational capabilities.

The light intensity of the incandescent light source can also be modulated as disclosed in a copending application in the name of Hill et al., entitled "Apparatus for Measuring The Amount of a Substance That Is Associated With a Base Material," Ser. No. 799,784, filed Feb. 17, 1969 to provide even more accurate measurements. Automatic computer control of the lamp voltage can also be provided for better accuracy.

I claim:

1. A method of measuring the amount of substance that is associated with a material in which a radiation source emits a first spectral band of radiation that impinges on the material but lies outside of the an absorption band of the substance and emits a second spectral band of radiation that lies within a resonant absorption band of the substance and in which first and second detector means are respectively responsive to the intensities of radiation of the first and second spectral bands which are reflected from or transmitted through the material, the method comprising the steps of, recurrently interrupting said radiation emission to said detector means, generating electrical signals for each of said detector means proportional to the difference between a predetermined internal parameter of said detector means while receiving said radiation and while said radiation is interrupted, obtaining the ratio of said difference signals said ratio being directly related to the amount of said substance, and standardizing said ratio by first filtering both of said spectral bands of radiation in the absence of said material to simulate said material in the absence of any associated substance, thereafter filtering in combination with said first filtering only said second spectral band of radiation to simulate a predetermined amount of substance, and standardizing by constructing a characteristic curve of wetness versus water weight of said material and thereafter updating said curve by use of ratios obtained by said filtering, such ratios in effect rotating and translating said curve.

2. A method according to claim 1 in which said wetness versus water weight curve is defined by the equation $$W = W_o + (R - R_o)(A \times B_w + B)$$

where
- $W$ is water weight
- $W_o$ is initial water weight
- $B_w$ is basis weight
- $R$ is said ratio indicating said wetness
- $R_o$, $A$ and $B$ are constants which are updated by said standardization where $A$ is related to said filtering of both spectral bands, $B$ to said filtering of said second band and $R_o$ is related to initial wetness as indicated by said curve which is updated by a function of said $A$ & $B$ constants.

* * * * *